United States Patent [19]

Archer et al.

[11] 4,414,266

[45] Nov. 8, 1983

[54] METHOD OF MANUFACTURE OF REINFORCED SHEET PLASTICS MATERIAL AND THE PRODUCTION OF MOULDED ARTICLES THEREFROM

[75] Inventors: Emmit W. Archer, Ann Arbor, Mich.; Derek F. Gentle, Danbury, England

[73] Assignee: Ford Motor Company, Dearborn, Mich.

[21] Appl. No.: 179,618

[22] Filed: Aug. 19, 1980

[30] Foreign Application Priority Data

Aug. 24, 1979 [GB] United Kingdom ................ 7929582

[51] Int. Cl.³ ............................................. B32B 27/36
[52] U.S. Cl. .................................... 428/287; 156/242; 156/244.11; 156/245; 428/411; 428/430
[58] Field of Search ............ 156/242, 245, 23, 244.11; 428/290, 337, 338, 361, 430, 287, 411

[56] References Cited

U.S. PATENT DOCUMENTS 3,765,998 10/1973 Oswald et al. ...................... 156/242
4,263,364 4/1981 Seymour et al. ..................... 428/430
4,269,884 5/1981 Della Vecchia et al. ....... 156/244.11

FOREIGN PATENT DOCUMENTS 1342147 12/1973 United Kingdom .
1347176 2/1974 United Kingdom .
1366091 9/1974 United Kingdom .

*Primary Examiner*—Caleb Weston
*Attorney, Agent, or Firm*—Peter D. McDermott; Roger L. May

[57] ABSTRACT

Polyethylene terephthalate (PET) sheet material incorporating fibrous reinforcement, e.g. 20 to 60% glass fibre, is holding superimposing layers of reinforcement and molten PET in contact under pressure and then cooling the layers to below the glass transition temperature of PET at a rate sufficient to avoid crystallization of the PET. The resulting sheet material contains PET in its amorphous phase and can be moulded to form articles such as motor vehicle body panels by heating the sheet in a mould to a temperature above its glass transition temperature but below its melting point and holding the sheet at that temperature until the PET undergoes crystallization.

22 Claims, 5 Drawing Figures

METHOD OF MANUFACTURE OF REINFORCED SHEET PLASTICS MATERIAL AND THE PRODUCTION OF MOULDED ARTICLES THEREFROM

DESCRIPTION

This invention relates to the manufacture of reinforced sheet plastics material and to the production of moulded articles therefrom.

Conventional sheet plastics material containing fibrous reinforcement having a staple length of 1 cm or more is usually produced from thermoplastic material by heating the plastics material to a temperature above its melting point, forming the molten material into a sheet together with the reinforcing material, for example by extruding the plastics material onto a mat of reinforcing fibres, and allowing the molten material to cool to below its melting point in contact with the mat. The resulting sheet can be thermoformed into a desired shape by heating the sheet to a temperature above the glass transition temperature of the plastics material under pressure in a suitable mould.

Polyethylene terephthalate (PET) is a plastics material which exists in a crystalline form and an amorphous form, which is unstable above the glass transition temperature of PET. Crystalline PET has physical properties which suggest that it would have great utility in the manufacture of structural panels, e.g. motor vehicle body panels, particularly if reinforced with a fibrous material such as glass fibre having a staple length of 1 cm or more. Thus, crystalline PET will resist deformation under loads at temperatures approaching its melting point (265° C.), which is much higher than most thermoplastic resins currently used for motor vehicle body panels, and sufficiently high to withstand the temperatures encountered in spray painting operations.

The application of the conventional technique for manufacturing reinforced plastics sheet material to the production of reinforced PET sheets suitable for subsequent moulding is associated with a number of practical difficulties. Thus, cooling from its melting point to its glass transition point, PET undergoes crystallization, an irreversible transition from the amorphous phase to the crystalline phase. Since crystalline PET cannot be thermoformed, sheet material containing crystalline PET must be melted before moulding. This not only requires considerable thermal energy, but also necessitates special precautions to exclude moisture because molten PET undergoes degradation on contact with water. In the past, the only form of PET which has been successfully moulded from sheet material is a relatively low molecular weight material ($M_{\bar{w}}$ less than 45,000), which is comparatively insensitive to moisture at its melting point.

According to the present invention there is provided a method of manufacturing a reinforced sheet material which comprises holding superimposed layers of fibrous reinforcing material and molten polyethylene terephthalate in contact under pressure and cooling the superimposed layers to below the glass transition point of the polyethylene terphthalate at a rate sufficient to avoid crystallization of the polyethylene terephthalate.

This invention utilizes the fact that PET undergoes the transition from its amorphous phase to its crystalline phase only between its melting point and its glass transition temperature, and that this transition does not occur instantaneously. By cooling the molten PET to below its glass transition temperature quickly whilst at the same time pressing together the superimposed layers of PET and reinforcing material, the reinforcing material can be incorporated into the PET before crystallization of the PET occurs to any substantial extent so that the PET in the resulting sheet material is substantially completely in the amorphous phase. In practice, a minor proportion, of crystalline phase PET for example, up to 20% by weight of the PET, and preferably no more than 10%, can be tolerated. The resulting sheet material can then be formed into a desired article by heating the sheet in a mould to a temperature in a range from above the glass transition temperature of the PET to below the melting point thereof, maintaining the sheet within the said range for a period sufficient to allow crystallization of the PET, and allowing the moulded sheet to cool to below the glass transition temperature. The resulting article will be composed of crystalline PET containing fibrous reinforcing material. Since the PET is not remelted during the moulding step, degradation of the PET by moisture during moulding is reduced, and the energy consumption of the moulding step is also reduced.

The precise rate of cooling necessary to ensure that the PET reaches its glass transition temperature before crystallization will depend upon the particular chemical composition of the PET and the pressure of any modifying agents blended with the PET. In general however, it will be necessary to cool the PET from its melting point, about 265° C., to below 160° C. in less than about 20 seconds and to continue cooling at that rate until the temperature of the PET falls below its glass transition temperature, about 80° C.

BRIEF DESCRIPTION OF THE DRAWINGS

FIG. 1 is a graph which illustrates schematically the time (t in seconds) in which the transition of PET from its amorphous phase (A) to its crystalline phase (B) occurs at temperatures (T, in °C.) between the glass transition temperature (g) and melting point (m). As seen in FIG. 1 if either amorphous or crystalline PET is heated to above its melting point m and then cooled, the amorphous material initially forms. This then undergoes a transition to the crystalline phase in a period of time which varies with temperature. The variation of this transition period with time shows a minimum at about 160° C. Thus, provided that the PET is cooled to below its glass transition temperature (g) sufficiently quickly, crystallization can be avoided.

Figure 1:
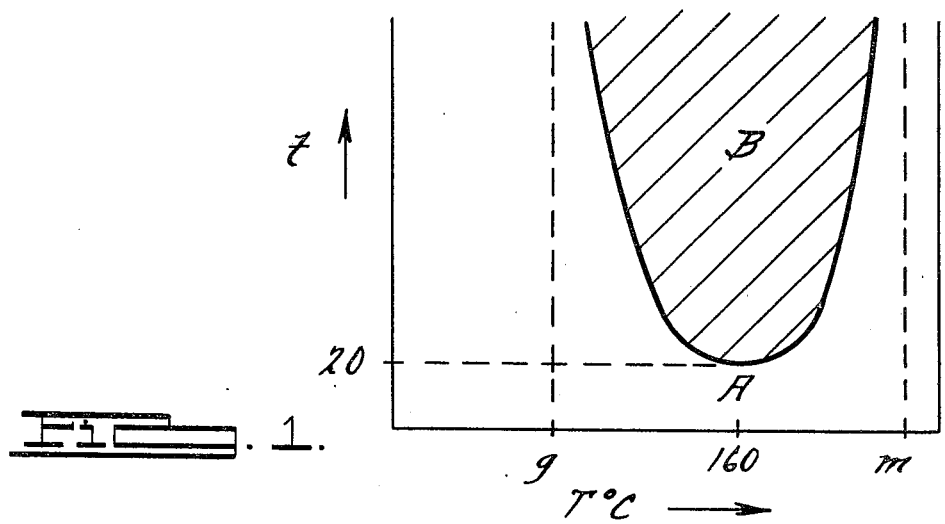
FIG. 1, illustrates the time in which the transition of PET from its amorphous phase to its crystalline phase occurs.

The PET used in the method of the invention preferably has a weight-average molecular weight greater than 45,000, for example in the range 55,000 to 60,000. The PET may be in the form of pure polyethylene terephthalate or in the form of a copolymer thereof with minor amounts of other copolymerisable materials. PET is readily available in pure and copolymerised forms. The copolymerisable materials are incorporated in the PET in order to produce desired physical properties, for example a slower rate of crystallization, a greater degree of crystallinity or improved impact resistance or resistance to cracking due to shrinkage or crystallization. Other additives may be blended with the PET for similar reasons. For example rubbers or polyolefin may be incorporated with the PET to modify its impact strength. The additives conventionally included in plastics moulding materials may also be incorporated in the PET, for example colouring agents, ultraviolet and heat stabilising agents, opacifying agents such as clays and fire retardants. Examples of typical additives and copolymerisable materials will be known to those skilled in the art. Such additives may include thea fibrous reinforcing material having a stable length less than 1 cm. The PET used as starting material may be either amorphous or crystalline. Where sheet PET is used as starting material, it is preferably amorphous because it is more easily handled than crystalline sheet material.

The preferred reinforcing material is glass fibre. The fibre may be in the form of staple fibres having a length of at least 1 cm, usually from 1 to 5 cm, or, more desirably, in the form of continuous fibres. Preferably the fibrous material is introduced into the sheet in the form of a mat composed of layers of fibres held together by needling or by a binder compatible with PET to form a loose cohesive web. The fibrous material will usually form from 20 to 60% by weight of the sheet material, preferably from 30 to 40% by weight.

In the production of the sheet material, the layers of PET and fibre may be superimposed and heated, compressed and cooled between two platens the temperature of which can be controlled. Since the production of accurate and rapid temperature changes in such platens is difficult, the layers are preferably superimposed by feeding a layer of PET and a mat of fibrous reinforcing material into a nip formed between two movable members which advance the superimposed layers through a heating and/or cooling zones in which the temperature of the layers can be controlled.

The layer of PET may be fed into the nip in the form of a sheet of solid PET. In this arrangement the superimposed layers would initially be advanced through a heating zone in which the PET was melted and then through a cooling zone. Alternatively the layer of PET may be fed into the nip in molten form directly from an extrusion device.

The nip may be formed by a plurality of pairs of heat conductive rolls, the temperature of which can be controlled so, that if necessary the superimposed layers are heated between a first set of rolls to a temperature sufficient to melt the PET, and then rapidly cooled between a second set of rolls. A release agent is preferably applied to the rolls to faciliate removal of the layers therefrom as they pass along the nip.

Alternatively, the nip may be formed by a pair of continuous movable heat conductive belts which are arranged to hold the layers in contact with each other continuously as the sheet is advanced through the heating and/or cooling zones. The use of such belts is preferred because they allow more accurate temperature control and since the PET remains in contact with the same region of the belt whilst cooling from its molten state to its solid state, difficulties in releasing molten PET from contact surfaces in the nip are reduced.

Suitable equipment incorporating such rolls or belts is readily available and will be familiar to those skilled in the art.

In order to ensure that the reinforcing material does not accumulate undesirably close to the surface of the sheet material, the layers of PET and reinforcing material are preferably arranged so that a layer of reinforcing material is sandwiched between two layers of PET. If desired, a plurality of layers of reinforcing material may be incorporated in the sheet. In such a case, each layer of reinforcing material is preferably sandwiched between two layers of PET.

The sheet material containing PET in its amorphous phase may be formed into an article of any desired shape using conventional hot pressure-moulding equipment. For example a sheet of the material may be shaped by compressing it between two matched metal mould tools. The tools are preferably coated with a release agent to faciliate removal of the moulded sheet therefrom. In order to reduce energy consumption in the moulding process, the sheet containing amorphous PET is preferably pre-heated before moulding, for example by radiant heaters, to a temperature above the glass transition temperature of the PET but at which the transition to the crystalline phase occurs relatively slowly, eg. from 90° to 120° C. The sheet is then moulded at a higher temperature at which the transition occurs more quickly. Usually a temperature of 150° to 170° C. is sufficient. The sheet is then held in the mould for sufficient time for the phase transition to occur, which will be at least 15 seconds, but usually not more than 30 seconds, after which time the sheet can be removed from the mould and allowed to cool. Meanwhile, the tool can be maintained at the higher temperature for use in a further moulding operation thus further reducing the energy consumption in a continuous process.

FIGS. 2 to 5 illustrate schematically examples of equipment suitable for producing sheet material in accordance with the invention.

In all the equipment illustrated, steps must be taken to exclude moisture since molten PET is subject to degradation if contacted with more than 0.002% by weight water.

Figure 2:
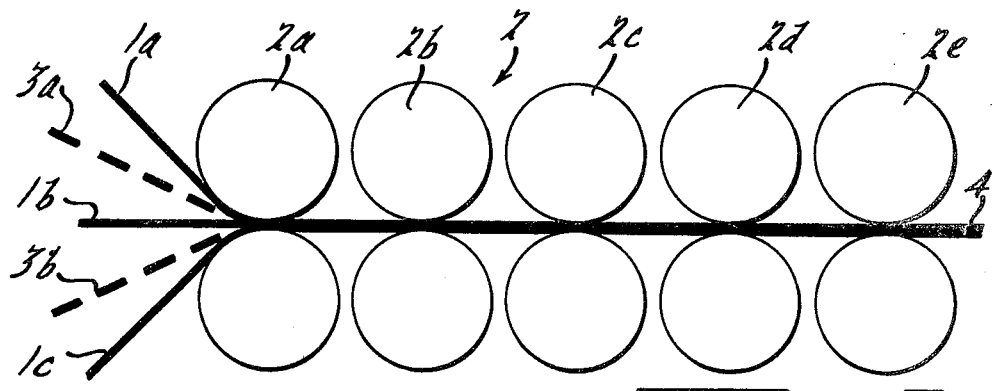
FIGS. 2–5 illustrate examples of equipment suitable for producing sheet material in accordance with the invention.

In the equipment shown in FIG. 2 three layers of PET 1 are fed from reels into a nip formed by a series of rolls 2. Two layers of glass fibre 3 in the form of a mat of continuous fibres are also fed into the nip, each layer 3 of glass fibres being sandwiched between two layers 1 of PET. Each pair of rolls 2 includes conventional means for controlling the temperature of the cylindrical surfaces of the rolls. The first two pairs of rolls 2a, 2b are heated to a temperature of at least 265° C. The heat from these rolls raises the temperature of the layers of PET and glass fibre to above the melting point of the PET, and the pressure exerted by the rolls causes the PET to flow into the interstices of the layers of glass fibre 3. The temperature of the next three pairs of rolls 2c, d, e, is maintained at 70° C. or lower by means of coolant which is circulated therethrough. The temperature of the rolls 2c, d and e must however be sufficient to avoid condensation of moisture thereon, which would cause degradation of the PET. The feed rate of the layers of PET and glass fibre through the nip is determined by the speed of rotation of the rolls 2 and is selected so that the temperature of the PET is reduced to below the glass transition temperature sufficiently quickly to present crystallization of the PET. The resulting sheet material 4 therefore contains amorphous PET reinforced with glass fibre.

The rolls 2 could be arranged in a vertical stack. A horizontal array is however preferred so that the molten PET is subjected to a minimum of working, which tends to expose the reinforcement at the surface of the sheet, thereby producing rough surfaces on the sheet.

Figure 3:
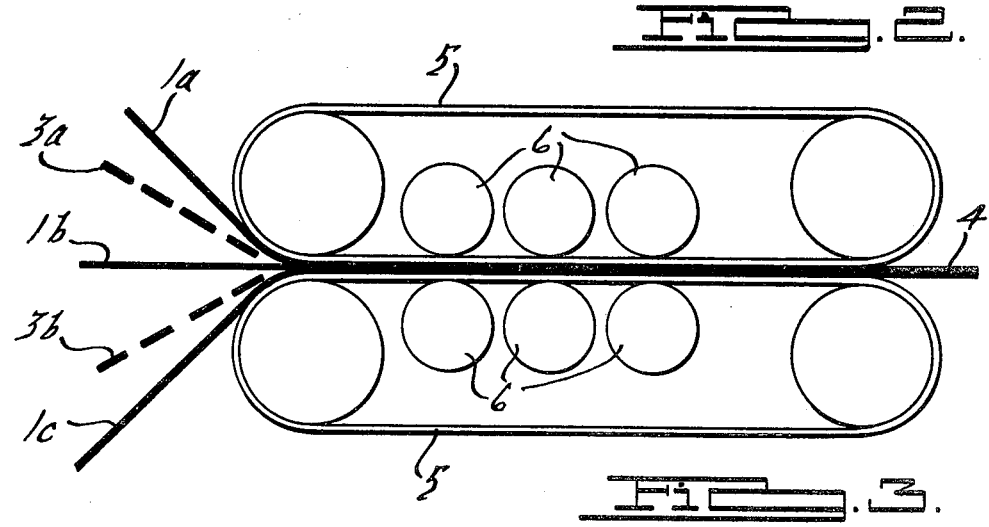

FIG. 3 illustrates an alternative apparatus for forming the laminate. In this apparatus, the amorphous PET sheets 1 and glass fibre mats 3 are fed into a nip formed by two continuous metal belts 5 which can be heated or cooled by rollers 6. The temperatures of rollers 6 are controlled to produce a hot zone, within which the sheet is heated to the melting point of PET, and a cold zone, within which the sheet is cooled to below the glass transition temperature of the PET. The temperature of the hot and cold zones and the rate of movement of the belts 5 are so selected that the sheet is cooled sufficiently quickly to prevent crystallization of the PET.

Figure 4:
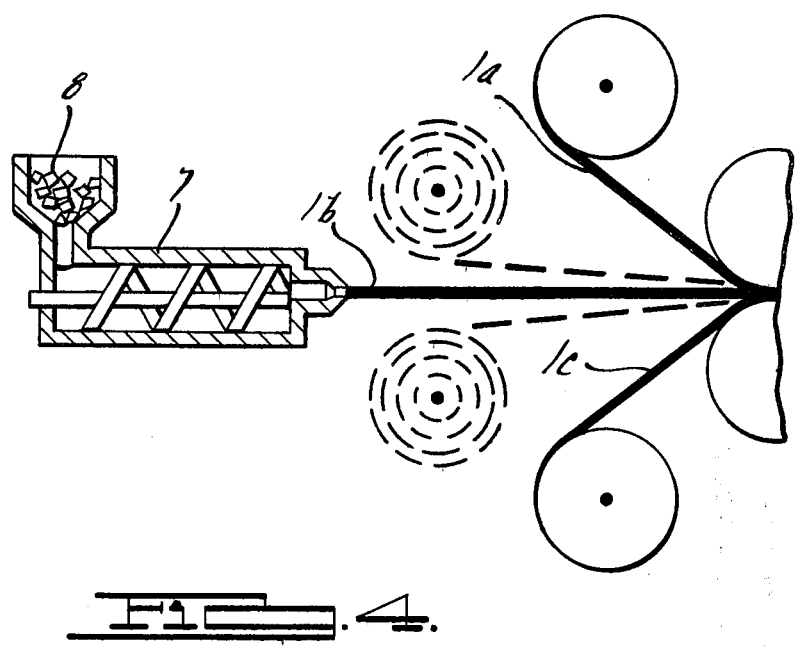

FIG. 4 illustrates an alternative feeding arrangement for the apparatus of FIG. 2 or 3.

In this arrangement two outer layers 1a, c of PET are fed into a nip from reels, whilst a central layer 1b of PET is fed into the nip directly from a heated extrusion device 7 of conventional construction, which may for example be fed from a hopper 8 containing pellets of crystalline PET. This feeding arrangement has the advantage that scrap PET and reinforcing material removed, for example, from the edges of the sheet can be recycled by feeding the scrap material into the extruder, thereby minimising waste.

Figure 5:
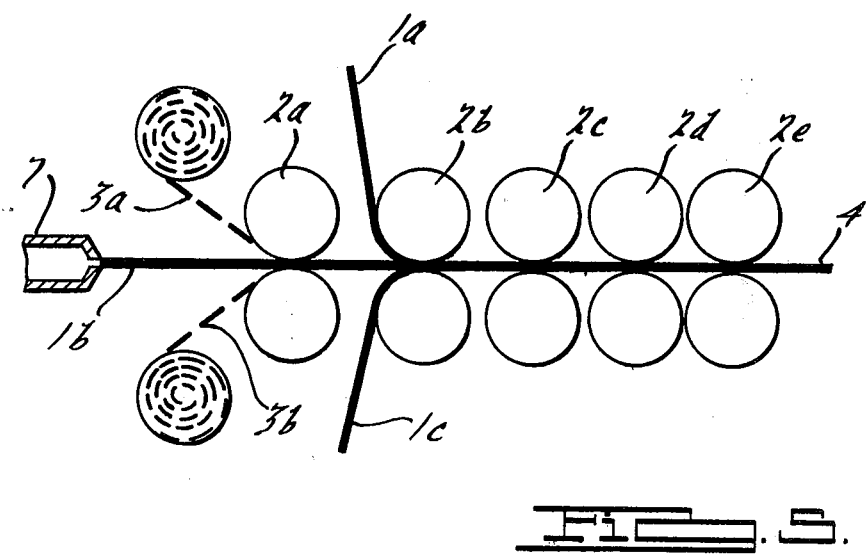

FIG. 5 illustrates alternative apparatus which a central layer 1b of PET is fed from an extrusion device 7 similar to that illustrated in FIG. 4 into a nip formed by two heated rolls 2a together with two layers of glass fibre mat 3a 3b. The rolls 2a are heated to a temperature sufficient to keep the PET above its melting temperature, and feed the superimposed layers 2a, 3a and 3b into a further pair of heated rolls 2b, into which two outer layers 1a, 1c of PET are also fed either from reels or from further extrusion devices. The rolls 2b are heated to a temperature sufficient to raise the temperature of the PET to above its melting point. Thereafter the layers of PET and glass fibre are fed through a series of cooling rolls 2c, d, e which are held at a temperature sufficiently low to ensure that the PET is cooled to below its glass transition temperature without crystallization. The heated rolls 2b and/or the cooling rolls 2c, d, e could, if desired be replaced by a pair of metal belts similar to those illustrated in FIG. 3 is desired. This feed arrangement has the advantage that the central layers of glass fibre becomes embedded within the central layer of PET before the outer layers are applied thereto, thereby reducing the possibility of the glass fibre becoming exposed at the surface of the finished sheet. Additionally, the separate application of heat to the three innermost layers of PET and glass fibre by the first rolls 2a ensure that the PET at the centre of the sheet is thoroughly heated to its melting point prior to cooling and contains no crystalline material.

The following examples, illustrates the invention.

EXAMPLE 1

Using apparatus similar to that illustrated in FIG. 3, a laminate was formed using three layers of a commercially available amorphous PET sheet material (obtained from Akzo, N.V. Holland) having a thickness of 0.4 mm, and two layers of continuous glass mat having a weight of 350 g/sq.m. The sheets were fed into the nip of the apparatus at a rate of 1 meter per minute. The heating zone of the apparatus was held at a temperature of 275° C. and the cooling zone was held at ambient temperature (20° C.). The resulting sheet material contained PET in a substantially amorphous form, and 40% by weight of glass fibres.

The sheet material was then heated to a temperature of 115° C. and formed in a mould held at a temperature of 160° C. for one minute after which substantial crystallisation of the PET had occurred. Upon cooling the moulded material was found to have the following properties:

Heat deflection temperature at 264 p.s.i. = 230° C.
Tensile strength = 15800 p.s.i.
Elongation = 4%
Flexural Modulus = 1,100,000 p.s.i.
Flexural Streng = 26,000 p.s.i.
Unnotched Izod impact strength
  at 23° C. = 17.7 ft-lbs/in.
  at 40° C. = 19.8 ft-lbs/in.
Notched Izod impact strength at 23° C. = 13.3 ft-lbs/in.

EXAMPLE 2

The process of example 1 was repeated using three layers of commercially available amorphous PET sheet, a material obtained from Eastman Kodak Inc., Plastics Division, United States of America having a thickness of 0.7 mm and two layers of continuous glass mat having a weight of 450 g/sq.m. The resulting sheet had a thickness of 2.2 mm and contained 30% by weight of glass fibre.

After hot moulding and consequent crystallisation of the PET, the resulting sheet had similar physical properties to that of Example 1.

What is claimed is:

1. A method of manufacturing a reinforced sheet material which comprises holding superimposed layers of fibrous reinforcing material and molten polyethylene terephthalate, in contact under pressure, and cooling the superimposed layers to below the glass transition point of the polyethylene terephthalate, the cooling being effected at a rate sufficient to avoid crystallization of the polyethylene terephthalate.

2. A method according to claim 1 wherein the layers are cooled to below 160° C. in less than 20 seconds.

3. A method according to claim 1 or claim 2 wherein the layers are superimposed, heated and cooled by feeding a sheet of polyethylene terephalate and a mat of reinforcing fibrous mat into one or more nips formed between two movable members which advance the layers through a heating zone and a cooling zone.

4. A method according to claim 3 wherein the nip is formed by two continuous movable belts which extend through the heating and cooling zones.

5. A method according to claims 1 or 2 wherein a layer of fibrous reinforcing material is sandwiched between two layers of polyethlene terephalate.

6. A method according to claims 1 or 2 wherein a plurality of layers of reinforcing material lying between two layers of polyethylene terephalate.

7. A method according to claims 1 or 2 wherein the reinforcing material comprises glass fibre having a staple length greater than 1 cm.

8. A method according to claims 1 or 2 wherein the reinforcing material comprises continuous glass fibre.

9. A method according to claims 1 or 2 wherein sheet material contains 20 to 60% reinforcing material.

10. A method according to claim 3 wherein the reinforcing material comprises continuous glass fibre.

11. A method according to claim 10 wherein the molten polyethylene terephthalate is formed by two continuous movable belts which extend through the heating and cooling zones.

12. A method according to claim 11 wherein a layer of fibrous reinforcing material is sandwiched between two layers of polyethylene terephalate.

13. A method according to claim 12 wherein a plurality of layers of reinforcing material are incorporated in the sheet, each layer of reinforcing material lying between two layers of polyethylene terephalate.

14. A method according to claim 13 wherein the reinforcing material comprises glass fibre having a staple length greater than 1 cm.

15. A method according to claim 14 wherein the reinforcing material comprises glass fibre.

16. A method according to claim 15 wherein the sheet material contains 20 to 60% reinforcing material.

17. Reinforced sheet produced by a method according to claim 16, wherein said polyethylene terephthalate comprises no more than 10% crystalline phase polyethylene terephthalate.

18. Reinforced sheet produced by a method according to claim 1, wherein said polyethylene terephthalate comprises no more than 10% crystalline phase polyethylene terephthalate.

19. A method of producing a moulded article which comprises manufacturing a reinforced sheet material by a method according to claims 1 or 2, and forming the sheet by heating the sheet in a mould to a temperature with the range of from about its glass transition temperature to below its melting point, and maintaining the sheet with the said temperature range for a period sufficient to allow crystallization of the polyethylene terephthalate, and cooling the crystallized polyethylene terephthalate.

20. A method according to claim 19 wherein the polyethylene terephthalate is maintained within a temperature range of from 150° to 170° C. for a period of 10 to 30 seconds.

21. Moulded articles produced by a method according to claim 19, wherein said polyethylene terephthalate has a weight-average molecular weight greater than 45,000.

22. Moulded articles produced by a method according to claim 20, wherein said polyethylene terephthalate has a weight-average molecular weight greater than 45,000.

* * * * *